Dec. 4, 1951  G. M. WALLER  2,577,291
REEL SPIDER FOR LAWN MOWERS
Filed Sept. 22, 1949
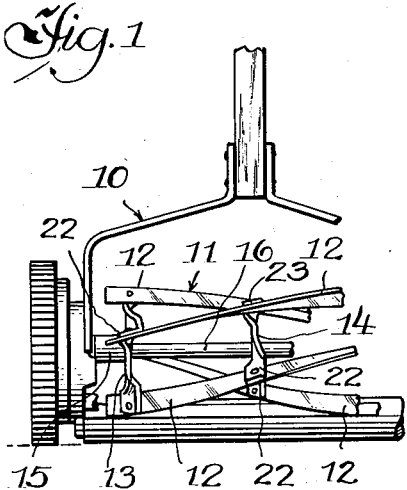
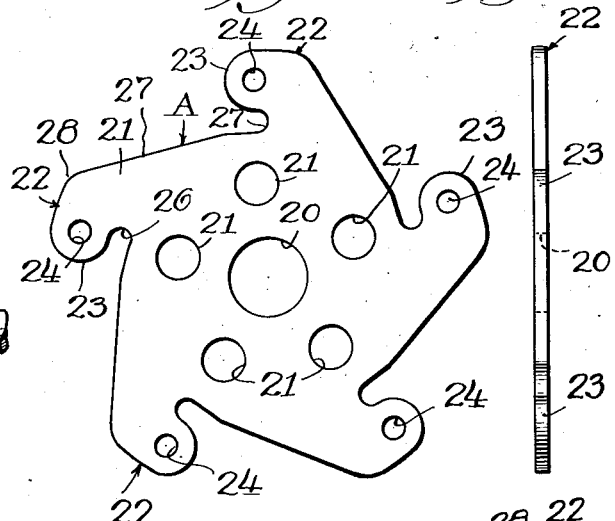
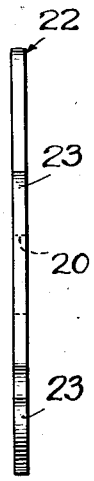
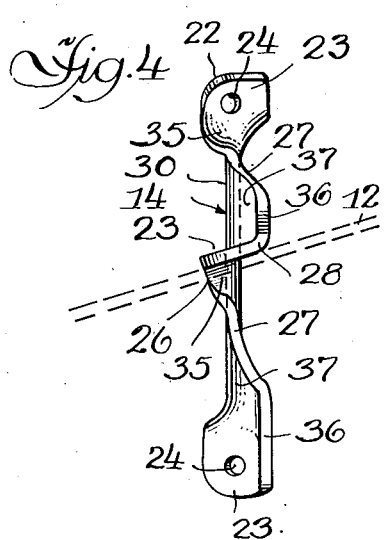
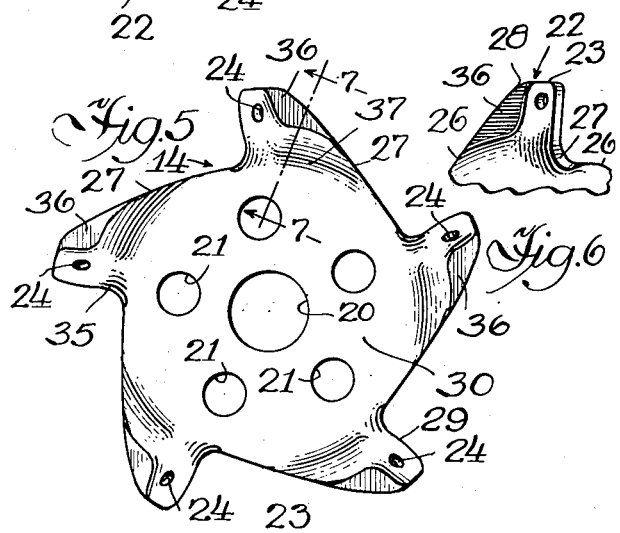
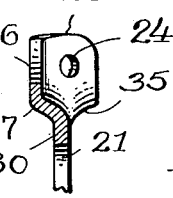
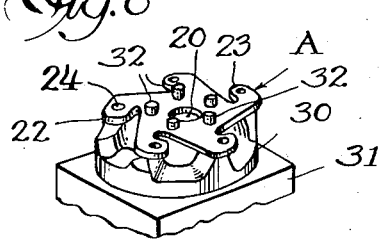
Inventor,
Gustav M. Waller
Parker & Carter Attys.

Patented Dec. 4, 1951

UNITED STATES PATENT OFFICE 2,577,291

REEL SPIDER FOR LAWN MOWERS

Gustav M. Waller, Geneva, Ill., assignor to Burgess-Norton Mfg. Co., Geneva, Ill., a corporation of Illinois Application September 22, 1949, Serial No. 117,103

5 Claims. (Cl. 56—294)

This invention relates to improvements in reels for lawn mowers and the like, and, more particularly, to sheet metal spiders on which the cutting blades are mounted.

Sheet metal spiders for lawn mower cutting reels have heretofore been employed but with generally unsatisfactory results because of the difficulty of providing adequate resistance to different stresses imposed on the spider during normal operation of a lawn mower. This weakness becomes particularly noticeable when it is attempted to sharpen the blades by reversing the rotation of the reel.

The principal object of the invention is to provide a novel form of cutting reel spider made of sheet metal having greater resistance to lateral bending than heretofore.

A further object is to provide an improved cutting reel spider of sheet metal having a novel conformation of twisted blade saddles or supports, including reinforcing webs to resist bending of said blade saddles under all normal conditions of use of the cutter reel.

Other objects of the invention will appear from time to time as the following description proceeds.

The invention may best be understood by the accompanying drawings, in which:

Figure 1 is a fragmentary front view of a lawn mower, with the cutter reel having a spider made in accordance with my invention;

Figure 2 is a face view of an initial stamping or blank of a spider made in accordance with my invention;

Figure 3 is an edge view of the blank shown in Figure 2;

Figure 4 is an edge view of the blank after it has been die-formed into final shape for use in a reel;

Figure 5 is a face view of the spider in final form, as shown in Figure 4;

Figure 6 is a fragmentary perspective view of one of the blade supporting saddles viewed from the opposite side from that shown in Figure 5;

Figure 7 is a detailed section taken along line 7—7 of Figure 5;

Figure 8 is a perspective view, illustrating one step in the die-forming of the blade saddles from the initial blank shown in Figure 2.

Referring now to details of the embodiment of my invention illustrated in the drawings, Figure 1 shows a typical mode of application of my improved form of sheet metal spider to a lawn mower, indicated generally at 10, and provided with a cutting reel 11, with a plurality of blades 12, 12 in conventional, helical arrangement with respect to each other. In the form shown, the reel 11 has an end spider 13 and an intermediate spider 14, both made in accordance with my invention. The two spiders 13 and 14 may be of identical construction, although in the form shown, the end reel 13 may be provided with a hub 15, which may be welded thereto, doweled or set-screwed, for mounting on the reel shaft 16, while the intermediate spider 14 is welded directly to the reel shaft 16, or may have a clearance hole.

For illustrative purposes, an intermediate spider 14, without hub, is shown in Figures 4 and 5. Each such spider is made from an initial stamping shown in Figures 2 and 3, which consists of a flat piece of sheet metal die-cut and pierced to form the blank A shown in Figure 2, including a central shaft hole 20, a plurality of smaller holes 21, 21 in equispaced relationship around the central hole 20, and a similar number of tangentially extending peripheral segments or projections 22, 22 terminating in generally semi-circular saddle portions 23, 23 which are ultimately intended to form the blade supporting saddles for the several cutter blades.

In the form of blank shown herein, five such tangentially extending segments 22 are provided, but obviously the number of such segments may vary depending upon the number of blades to be used in the cutter reel. In the preferred form shown, each of the terminal saddle portions 23 is pierced at 24 to form rivet holes during the same operation that the intermediate holes 21 and the center hole 20 are pierced.

As will be observed in Figure 2, the intermediate holes 21 are each located in the same circumferential and radial relation with its adjacent projection 22. These holes 21 not only serve to reduce the weight of the spider but also serve as positioning holes for the spider during the next operation in the manufacture of the spider, as will presently be described.

In the blank shown in Figure 2, each of the tangentially extending segments 22 have their leading base undercut along its leading edge, as indicated at 26, and each following edge 27 extending in a generally tangential direction from an outer corner portion 28 to the next adjacent undercut edge 27 at the base of the proximate segment.

The segments 22 are given their final form by bending or twisting the saddle portions 23, with adjacent portions of the blank, into the final form shown in Figures 4 to 7. This bending or twisting operation may be performed between any suitable dies, as more or less diagrammatically indicted in Figure 8, wherein a suitable bottom die 30 on a base 31 is provided with a plurality of upstanding pins 32, 32 which fit in the intermediate holes 21, 21 of the blank A shown in Figure 2. A suitable companion upper die (not shown) is then brought down on the blank to impart the desired final form to the segments 22 and adjacent parts of the spider.

In the final form of the spider, the saddle portions 23 of the segments 22 are each bent or twisted through an angle of almost 90 degrees, as shown in Figure 4, so as to form a substantially flat face 29 on the leading side of the saddle, to which one of the mower blades 12 may be riveted or otherwise secured at the normal angle of said blade. It will be noted, however, that each saddle portion 23 is twisted so that the rivet hole 24 thereof is maintained substantially in the same plane as the initial normal plane of the blank A, and that the intermediate portions of the blank, between the saddle portion 23 and the flat central area 30 of the blank, are simultaneously bent in opposite directions about an axis, intersecting said rivet hole so that a substantial portion of the blank adjacent the curved undercut line 27 of the blank is bent to one side of the flat central area 30 to form a substantial reenforcing web 35. This reenforcing rib 35 extends in an arc from the base of the side edge of the flat saddle portion 23 and merges into the main plane of the central area 30 of the spider before it reaches the adjacent centering hole 21.

The portion of the blank adjacent to, and including, the relatively longer leading edge 27 of each segment is curved outwardly in the opposite direction from the curved undercut edge 26 of the proximate segment and merges into a generally triangular flattened area 36, which is preferably die-formed simultaneously with the twisting operation so as to extend in a plane substantially parallel to, but offset to the right of, the normal plane of the central area 30 of the spider, as shown in Figure 4. These flattened areas 36 thus form substantial reenforcing webs extending the full height of the outer side edge of each blade saddle 23 at the following side thereof, as shown in the drawings.

The laterally curved web portions, which join the offset flattened areas 36 to the central flat area 30 of the spider on the following side of each saddle, are indicated at 37. These webs 37 merge inwardly and downwardly into the central area 30 along smoothly curve arcs substantially concentric with the latter. Also, each of the webs 37 merges forwardly on a smooth curve into the web 35 which, as previously explained, extends toward the opposite edge of its saddle at the base thereof.

The use and operation of a reel spider, above described, is as follows:

The spider may be mounted on a reel shaft of a lawn mower either by directly welding or brazing it to said shaft or by providing an intermediate hub formed integrally with and welded or brazed to the center of the spider for mounting on the reel shaft.

The blade saddles are bent or twisted during the forming operation, previously described, so as to assume a permanent angular relation to the flat central area 30 of the reel, at a proper angle to receive the blades of the reel riveted or otherwise secured thereto. In the preferred form shown, the rivet hole 24 on each blade saddle is finally disposed substantially in the same plane as that of the central flat area of the spider, and each saddle extends substantially equally on opposite sides of said flat central area of the spider. Each of the saddles is fully reenforced along both side edges to resist excessive stresses in all directions during the use of the reel, the leading edge of each saddle being reenforced at its base by the web 35, and the following edge being reenforced along its entire length by the flattened laterally offset areas 36 which are connected by the inwardly curved webs 37 into the normal plane of the spider, as defined by the central flattened area 30. The oppositely extending reenforcing webs 35 and 37 at the base of each saddle also merge into each other on a smooth, continuous curve, extending substantially circumferentially of the spider so as to present a minimum resistance to grass and the like while the reel and spider are cutting, and to aid in clearing the spider of cut grass and the like, which otherwise would tend to be caught and accumulated about the base of each saddle.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. A spider for lawn mover reels formed of a sheet metal plate having a substantially flat central area and a plurality of similar circumferentially spaced cutter blade saddles, each initially including a peripherally projecting segment of said plate having a relatively short leading edge undercut at its base and a relatively long following edge extending in a generally tangential direction from its outer edge to the undercut base of the proximate segment, a flat terminal portion of each segment being bent through an angle of more than 45 degrees to said flat central area to form a blade saddle, with its side edges projecting on opposite sides of said central area and each joined to said flat central area by integral reenforcing webs bent laterally from said central area in opposite directions.

2. A reel spider in accordance with claim 1, wherein each peripheral segment has a rivet hole initially formed therein and said segment is bent on an axis substantially coincident with said rivet hole, and the side edges of each blade saddle, extends a substantially equal distance on opposite sides of the central area of the spider and its respective rivet hole.

3. A reel spider in accordance with claim 1, wherein the reenforcing web at the leading side of each blade saddle is formed by bending the undercut base portion of its respective segment in a laterally curved direction to merge directly into the lower end of the leading side of its blade saddle.

4. A reel spider in accordance with claim 1, wherein the reenforcing web at the following side of each blade saddle is formed by bending the long following edge portion of its respective segment in a laterally curved direction to merge with the following side of said blade saddle for substantially the full length of the latter.

5. A reel spider in accordance with claim 4, wherein the last-named reenforcing web includes a substantially flat marginal portion adjoining the following side of said blade saddle and offset from, but substantially parallel to, the flat central area of said spider.

GUSTAV M. WALLER.

REFERENCES CITED

The following references are of record in the file of this patent:

UNITED STATES PATENTS

| Number | Name | Date |
| --- | --- | --- |
| 2,460,111 | Worthington | Jan. 25, 1949 |
| 2,479,741 | Grimland | Aug. 23, 1949 |
| 2,495,372 | Goldberg | Jan. 24, 1950 |
| 2,500,091 | Parr | Mar. 7, 1950 |